United States Patent [19]

Bernett

[11] 4,021,257

[45] May 3, 1977

[54] CEMENTIOUS COMPOSITION FOR USE IN PREPARING POINTING COMPOUNDS OR MORTAR COMPOUNDS

[75] Inventor: Frank E. Bernett, Yardley, Pa.

[73] Assignee: Tile Council of America, Inc., Princeton, N.J.

[22] Filed: July 9, 1975

[21] Appl. No.: 594,602

Related U.S. Application Data

[63] Continuation of Ser. No. 412,152, Nov. 2, 1973, abandoned, and a continuation of Ser. No. 430,214, Jan. 2, 1974, abandoned.

[52] U.S. Cl. .................................. 106/90; 106/92; 106/93; 106/97
[51] Int. Cl.² ...................... C04B 7/02; C04B 7/352
[58] Field of Search .................. 106/90, 92, 93, 97

[56] References Cited

UNITED STATES PATENTS

| | | | |
|---|---|---|---|
| 2,868,753 | 1/1959 | Morgan et al. | 106/90 |
| 3,030,258 | 4/1962 | Wagner | 106/93 |
| 3,243,307 | 3/1966 | Selden | 106/93 |
| 3,779,971 | 12/1973 | Isenburg | 260/29.6 S |
| 3,824,107 | 7/1974 | Weiant | 106/93 |
| 3,937,633 | 2/1976 | Knight et al. | 106/90 |

*Primary Examiner*—J. Poer

[57] ABSTRACT

A cementious composition is provided which comprises 25 to 100% Portland cement and from 0.001 to 0.25% of certain long-chain organic polymers having a Flocculation Index of less than 0.5. A dry-set grout composition may be prepared using the composition or a sag-resistant dry-set mortar compound may be prepared using the composition.

19 Claims, No Drawings

CEMENTIOUS COMPOSITION FOR USE IN PREPARING POINTING COMPOUNDS OR MORTAR COMPOUNDS

CROSS-REFERENCE TO RELATED APPLICATIONS

This application is a continuation of my prior U.S. patent application Ser. No. 412,152, filed Nov. 2, 1973, entitled "Sag-Resistant Dry-Set Mortar Composition," and Ser. No. 430,214, filed Jan. 2, 1974, entitled "Portland Cement Grout With Improved Workability Characteristics," both now abandoned, said latter application being related to my prior U.S. patent application Ser. No. 412,152, filed Nov. 2, 1973, entitled "Sag-Resistant Dry-Set Mortar Composition."

BACKGROUND OF THE INVENTION

1. Field of the Invention

This invention relates to Portland cement compositions which can be utilized to produce, on the one hand, pointing compounds which are more commonly known as tile grout and, on the other hand, mortar compounds for use in setting tile. In its use as a pointing compound, such compounds function to fill joints between the porous edges of ceramic tiles which have been installed dry. In its use as a mortar compound, the compund functions as the means for setting ceramic tile and is characterized as being dry-set mortar compositions which are sag resistant.

2. Description of the Prior Art

Since the compositions of the present invention can be adapted to function either as a pointing compound or a mortar compound, the discussion of the prior art will be given in separate sections as follows:

A. Pointing Compounds

In the setting of ceramic tile, the customary procedure employed is to fill the areas or joints between the adjacent tiles with a bonding material. The material used to fill the joints is referred to as pointing compound or, as it is more commonly known, a tile grout. A variety of grout compounds presently exist, e.g. acrylic grout, epoxy grout, Portland cement grout.

Dry-set Portland cement grout is the grout commonly used to fill the joints between the porous edges of ceramic tile which has been dry-set. A dry-set Portland cement grout normally is made up of Portland cement, a filler, such as a fine limestone or marble dust, and a small amount of water soluble organic thickener, such as methyl cellulose. Illustrative of dry-set Portland cement grouts are the grouts disclosed in U.S. Pat. No. 2,820,713 (Wagner, issued Jan. 21, 1958) and U.S. Pat. No. 2,838,411 (Wagner, issued June 10, 1958).

Grout in general, and dry-set Portland cement grout in particular, desirably have the properties of strength, stain resistance and workability. Such grout should be easy to clean from the wall and should facilitate dressing the joints to easily achieve a satisfactory aesthetic appearance.

Dry-set Portland cement grouts which have large amounts of filler such as fine limestone or marble dust present rather than a large percentage of Portland cement provide good workability. These grouts are easy to clean from the wall and facilitate dressing the joints. When the fine limestone or marble dust content is greater than 25% of the total weight of the dry composition, and preferably above 35%, workability is greatly enhanced. Conversely, when dry-set Portland cement grout contains 75% or more Portland cement, strength and stain resistance is greatly improved.

B. Mortar Compounds

At present, tile, and particularly ceramic tile, is set in many cases by dry-set Portland cement mortars. For many years the Portland cement compositions used required a very thick bed and generally also required a mortar coat for setting the tile. Eventually, these thick mud-method Portland cement mortars were replaced to a great extent by tin-bed Portland cement dry-set mortars. Typical dry-set mortars are thin-bed mortars and primarily include Portland cement, sand, a water retentive cellulose ether, such as methyl cellulose or hydroxyethyl cellulose or hydroxy propyl cellulose. Water is added to the composition prior to use. U.S. Pat. No. 2,934,932 (Wagner, issued May 3, 1960) and U.S. Pat. No. 3,243,307 (Selden, issued Mar. 29, 1966) are illustrative of the dry-set mortars which are currently used to set tile in thin beds. On other occasions a rubber or polymer latex may be added to the dry mix to make a mortar, which is known as a latex Portland cement mortar. The latex may contain some of the additives in solution that otherwise would be part of the dry mix.

One of the many properties required for an acceptable mortar for setting tile is that it be sag resistant. Sag resistance is a term used in the trade and defined by a test method that is part of the American National Standard Specification for Dry-Set Portland Cement Mortar — A 118.1. Sag resistance is a property or a characteristic relating to the ability of the mortar to resist movement under load until a certain load level is reached. This property or characteristic is vitally important in dry-set mortars and also to a latex mortar, since a mortar to be practically functional must be in a slurry or paste form on the one hand, but also must be capable of supporting the load imposed on it by the tiles being set. It is vital that the mortar support the tile without any appreciable sinking of the tile into the mortar during the period in which the mortar sets. In wall applications sag resistance is even more critical because the mortar must hold the tile in position on the wall during the period in which the mortar is setting.

At present, short asbestos fibres are used to provide dry-set mortars with sag-resistance characteristics. Illustrative of the dry-set mortar compositions having fibers to resist sag are U.S. Pat. No. 3,030,258 (Wagner, issued Apr. 17, 1962) and U.S. Pat. No. 3,243,307 (Selden, issued Mar. 29, 1966). Although the asbestos fibers and fibers in general are suitable for providing dry-set mortars with sag-resistant properties, asbestos fibers and fibers in general have been found to be undesirable and the use thereof has recently been limited by national safety laws.

SUMMARY OF THE INVENTION

The present invention is directed to providing a new and novel Portland cement composition which is suitable for use in the preparation of a dry-set ceramic tile grout or a sag-resistant dry-set mortar composition.

In its use in a grout, the present invention is concerned with providing dry-set ceramic tile grout which has high strength, good stain resistance and good workability. It is further directed to providing dry-set ceramic tile grout of all types with greater workability. To this end, a dry-set ceramic tile grout composition is provided which contains from 0.001 to 0.20% by dry weight of a long-chain organic polymer having a Flocculation Index of less than 0.50. The dry weight of the composition is the composition before water is added to make the grout.

In its use in a mortar compound, a primary object of the present invention is to provide dry-set mortars having a high degree of sag resistance without having included therein any ingredient which will be undesirable or harmful to the individuals who must work with the dry-set mortars. The present invention provides the use of certain clays, certain long-chain organic polymers, or a combination of clays and long-chain organic polymers. Illustrative of these clays that perform to provide mortar with sag resistance are attapulgite clays and montmorillonite clays. The long-chain polymers are certain hydrophilic long-chain organic polyelectrolytes and anonic molecules are acrylamides, ethylene oxide, alkali metal salt of carboxymethyl cellulose, starch and starch derivatives. The long-chain polymers will be present in an amount of about 0.01 to 0.25% by dry weight.

DESCRIPTION OF THE PREFERRED EMBODIMENT

The description of the preferred embodiment of the present invention will be given in two separate parts, as follows:

A. Pointing Compounds

The composition of the invention, when used in the production of a pointing compound is a dry-set ceramic tile grout having improved workability properties. The improved workability is manifested by providing a firm consistency grout which can be more easily troweled between the tile. It is no longer necessary that the grout be made watery or soupy to facilitate trowelling. In addition, the grout of this invention can be cleaned from the faces of the tile and from the over-full joints easier and faster without forming a slurry on the tile installation during the cleaning that visually obscures the effects of the cleaning during the operation.

The grout of the invention includes conventional Portland cement tile grout containing a small amount of a long-chain organic polymer. The dry mix of the grout comprises from about 25 to 100% Portland cement, from 0 to 75% filler. and from 0.001 to 0.20% of long-chain organic polymer having a Flocculation Index of less than 0.50 and preferably a Flocculation Index of less than 0.30. The filler materials are typical, such as limestone or marble dust. Dry-set grouts contain a small amount of a water soluble organic thickener, i.e. 0.1 to 0.6% methyl cellulose in the dry mix.

A particularly good embodiment of the grout of the invention contains from 75 to 100% Portland cement, from 0 to 25% filler, 0.1 to 0.6% methyl cellulose and from 0.001 to 0.20% of a long-chain organic polymer having a Flocculation Index of less than 0.50 and preferably less than 0.30.

B. Mortar Compounds

The invention of this application, when used in the production of a mortar compound, is a composition which is used to set ceramic tile, brick slate, small stones and other similar products both on walls and on floors. The composition must have suitable properties for holding the tile or other material on the wall or floor securely and uniformly. Elevational differences in the tiles on the floor and irregular positioning of tiles on the wall cannot be tolerated.

One of the most significant properties that the mortar must have is sag resistance. Sag resistance is a matter of degree. An otherwise effective dry-set mortar can be formulated which would have virtually no sag resistance. However, great difficulty would occur when tiles were attempted to be set on walls. The tile would slide down out of position because the mortar would not hold the tiles by virtue of its own characteristics.

As seen in U.S. Pat. No. 2,934,932 (Wagner, issued May 3, 1960) and U.S. Pat. No. 3,243,307 (Selden issued Mar. 29, 1966), conventional dry-set Portland cement mortar compositions adapted for use in grouting and setting tile consist of 24 to 99.4% Portland cement and from 0 to 75% filler-like sand or limestone and 0.2 to 6.5% of a water-soluble cellulose ether, e.g. methyl cellulose (0.2 to 6.5%), methyl hydroxy propyl cellulose or hydroxy ethyl cellulose (0.6 to 4.0%). Dry-set mortars used principally for setting rather than grouting tile usually contain 30 to 100% Portland cement, 0 to 70% filler-like sand or limestone and 0.4 to 1.2% of the water-soluble ether. The dry-set mortars also may include minor amounts of polyvinyl alcohol and ether ingredients.

The tile setting mortar composition of the present invention includes a conventional Portland cement mortar composition having small amounts of certain clay, certain long-chain organic compounds or combinations of clays and long-chain organic compounds incorporated therewith.

The clays which have been found to provide suitable sag resistance to the conventional Portland cement mortar compositions independent of any other ingredient are attapulgite clays and montmorillonite clays. Specifically, ATTAGEL 150 (Minerals and Chemicals Corp. of America), ATTAGEL 40 (Minerals and Chemicals Corp. of America) and bentonite clay are particularly suitable for providing sag resistance to Portland cement mortar compositions. The provision of from about 0.5 to 3.0% by weight of ATTAGEL 150, ATTAGEL 40 or bentonite clay provide conventional Portland cement compositions with good sag-resistance properties.

The long-chain polymers which have been found to provide sag resistance to Portland cement mortar compositions are certain long-chain organic compounds which have a Flocculation Index of less than 0.5. RETEN (Hercules, Inc.), RETEN A-1 (Hercules, Inc.), alum hydroxalkyl starch (Hercules, Inc. CERON 1104-B), sodium carboxymethyl cellulose having a degree of esterification between 0.2 and 0.5 and a 1% viscosity of 1000 to 4000 cps, and polyacrylamide (Dow Chemical Co. SEPARON N P.20) are illustrative of the long-chain organic polymers which provide sag resistance in conventional Portland cement mortar compounds.

The use of a long-chan organic compound in a cement slurry in accordance with the present invention promotes sag resistance. The long-chain organic compounds suitable for use in the invention have a Flocculation Index below 0.50, preferably below 0.40 and most desirably below 0.30. The long-chain organic compounds can be anionic, cationic or nonionic. The long-chain organic compounds with a Flocculation Index below 0.50 provide good sag resistance in a dry-set Portland cement mortars when they are between 0.01 and 0.25% by weight of the composition.

FLOCCULATION INDEX TEST METHOD

An essential component to be added to the Portland cement regardless of the use of the ultimate compound is the long-chain organic polymer. In order for the polymer to function in its intended manner, the compound must have a Flocculation Index of less than 0.50 and preferably below 0.40, and more desirably below 0.30.

The method for determining the Flocculation Index of a long-chain polymer in Portland cement and thereby ascertain its usability in the present invention is as follows:

a. Mix 30 grams of Portland cement with 190 grams of water and shake the mixture to disperse the cement.

b. Immediately after shaking, pour the mixture into a 200 ml graduate and start a stop watch when the graduate is filled to approximately 200 ml.

c. As the cement particles settle, a line between the clouded slurry and the relatively unclouded upper portion of the liquid in the graduate is visibly discernable. When this line falls to the 160 ml mark on the graduate, stop the watch and record the elapsed time in seconds as the Settling Time.

d. Repeat the above procedure but dissolve a small amount of the organic material to be tested as a flocculant in the water before combining it with the dry cement.

e. The ratio of the Settling Time with flocculant to the Settling Time without flocculant is an index of the effectiveness of the added organic compound or mixture, i.e., the Flocculation Index.

It has been found that organic additives that give a Flocculation Index of 0.5 or less are effective in this invention, although those that give an Index of 0.4 and those that give an Index of 0.3 or less are most desirable. It has also been found that some additives that give high Index at one concentration give lower ones at other concentrations. Sometimes increasing the amount of additive lowers the Index and sometimes decreasing it lowers the Index.

Generally, 0.005 grams of additive in the mixture of 30 grams of cement and 190 grams of water is a useful level at which to make an evaluation. TABLE I shows results of this test used to evaluate long-chain organic polymers as useful flocculants for Portland cement in producing either pointing compounds or mortar compounds in accordance with the present invention.

TABLE I

Using the Flocculation Index Test Method recited in this specification, the following organic compounds were tested for their ability to flocculate Portland cement, and their Flocculation Index was calculated.

|  | Additive to Portland Cement and Water Mixture | Amount of Additive-qms | Settling Time (Seconds) | Flocculation Index |
|---|---|---|---|---|
| 1. | None | — | 100 | 1.00 |
| 2. | Polyacrylamide, SEPARAN | .005 | 15 | .15 |
| 3. | Polyacrylamide, SEPARAN NP-10 | .05 | 15 | .15 |
| 4. | Polyacrylamide, SEPARAN NP-20 | .005 | 14 | .14 |
| 5. | Modified Starch, CERON 1104-B | .005 | 34 | .34 |
| 6. | Modified Starch, CERON 2069 | .005 | 45 | .45 |
| 7. | Modified Starch, STARAMIC 211 | .005 | 25 | .25 |
| 8. | Polyethylene Oxide, POLYOX 3253 | .005 | 85 | .85 |
| 9. | Methylcellulose MC-4000-65HG | .005 | 55 | .55 |
| 10. | Polyacrylamide, RETEN A-1 | .005 | 11 | .11 |
| 11. | Polyacrylamide, RETEN 200 | .005 | 60 | .60 |
| 12. | Polyacrylamide, RETEN 205 | .005 | 44 | .44 |
| 13. | Polyacrylamide, RETEN 834.1 | .010 | 84 | .84 |
| 14. | Polyacrylamide, SPX-5015 | .025 | 60 | .60 |
| 15. | Polyacrylic Acid PAA-25 | .005 | 80 | .80 |
| 16. | Sodium Carboxymethyl-Cellulose SPX-5043 | .005 | 86 | .86 |
| 17. | Sodium Carboxymethyl-Cellulose SPX-5043 | .05 | 32 | .32 |
| 18. | Polyacrylamide, RETEN 200 | .030 | 40 | .40 |
| 19. | Sodium Carboxymethyl-Cellulose, CMC-190 High | .010 | 73 | .73 |

EXAMPLES OF POINTING COMPOSITIONS

The following illustrative examples report the results of tests made to empirically determine the performance of the grouts made in accordance with the present invention.

EXAMPLE I

To the following typical dry-set grout for wall tile:

| Ingredient | Percent |
|---|---|
| Portland Cement | 79.4 |
| Methyl cellulose, 100 cps in 2% aqueous solution | 0.6 |
| Ground limestone | 20.0 |
| TOTAL | 100.0 |

An anionic polyacrylamide that could flocculate Portland cement was added at the 0.01% level, and water was added to the combination at 40 ml/100 grams of dry-mix.

The resulting grout was used to fill the joints between installed 4¼ by 4¼ glazed wall tile by the usual method. When compared to the grout without polyacrylamide added, the flocculated grout troweled easier and the excess grout was much easier to clean from the tile faces and joints. It took 12 minutes of work to complete the grouting of 26 sq. ft. of tile with the typical grout, but only 10 minutes of work with the flocculated grout. This is known to represent a significant improvement in the workability of the grout.

EXAMPLE II

When a modified starch, CERON N 2069, was added to the typical dry-set grout described in EXAMPLE I at a 0.02 level, a similar improvement in workability is noticeable to an experienced mechanic. CERON N 2069 is a hydroxy alkyl starch with a degree of substitution greater than 0.1.

EXAMPLE III

For this experiment I used a commercial wall tile grout of the following approximate formula:

| Ingredient | Percent |
|---|---|
| Portland Cement | 67.5 |
| Methyl Cellulose | 0.5 |
| Limestone | 32.0 |

I grouted small areas of wall tile using the grout as supplied and with 0.01% RETEN A-1 (polyacrylamide) added. To 200 grams of dry-mix I added 85 ml of water to mix the grouts.

The flocculated grout was slightly stiffer in the pot, but it troweled equally as well as the plain grout. I made an attempt to clean the excess grout from the tile faces and joints and shape the joints to final contour, all in one cleaning operation with a wet sponge. The flocculated grout responded well with the grout in the joints staying firm as I washed, but the plain grout was difficult in that too much grout washed from the joints too easily and some joints were too deep.

Consequently, I applied the plain grout to another area and washed it once to remove excess grout, but without attempting to wipe the joints to a final contour. Later in a second wash I shaped the joints successfully. As a rule, this two-wash method is the one used in the field.

All three test areas dusted clean easily with a cloth after they dried. The best looking one from the point of even, smooth joints was that one done with flocculated grout. The worst was the plain grout test done with the one-wash method.

Clearly, the flocculated grout could be washed and dressed neatly without special care and particular attention, neither of which can be given in the field under production conditions. A mechanic could turn out a finished job with less time spend because he could work with less caution and eliminate the second wash.

EXAMPLE IV

To a conventional Portland cement tile grout mix containing sand of the approximate formula
    Portland Cement — 300 gms
    Graded Sand — 700 gms
water was added to make a proper grouting consistency.

Also, a grout was made that was the same except that 0.01% (0.1 gms) of an anionic polyacrylamide with a Flocculation Index of 0.11 was included in the grout.

Quarry tile set in dry-set mortar were grouted with each grout. The grout containing the anionic polyacrylamide was perceptably easier to trowel into the joints keeping the troweled joints full, and it was easier to wash the excess from the tile and shape the joints with a damp sponge without removing grout from the joints. The cured and dried joints were compared and those made with grout containing the polyacrylamide were of more even color, fuller to the level of the tile edges and of a smoother, less pitty appearance.

It was clearly a case of making a good thing better. On a large area of tile, such as those grouted on a job, a mechanic would find his job easier and his finished work more acceptable.

EXAMPLES OF MORTAR COMPOUNDS

The following illustrative Examples report the results of tests made with mortar compounds made in accordance with the present invention:

EXAMPLE V

The following Dry-Set Portland cement mortar dry-mix was made:

| | |
|---|---|
| Portland cement | 393.2 gms |
| methylcellulose (4000 cps) | 3.8 gms |
| sodium carboxymethylcellulose (D.S. of approx. 0.4) | 1.0 gms |
| polyvinyl alcohol (73% to 77% hydrolyzed) | 1.2 gms |
| urea | 0.8 gms |
| silica sand (−30 mesh) | 600.0 gms |
| Total | 1000.0 gms |

To 300 gms of the dry-mix 69 ml. of water was added to bring it to a workable consistency. Following the procedure for measuring "Sag on Vertical Surfaces" from American National Standard Specification for Dry-Set Portland Cement Mortar — A118.1–1967, the mortar was tested. It showed no sag. In all other properties, for which it was tested, it proved to be a good dry-set mortar. The sodium carboxymethylcellulose with degree of etherification (D.S.) of between 0.2 and 0.5 proved to be a good substitute for asbestos fibre. It gave a Flocculation Inded of 0.32 when tested as described in TABLE I at a 0.5 gram level.

EXAMPLE VI

The mix and experiments of EXAMPLE V were repeated except that hydroxyethylcellulose (30,000 cps) was substituted for the methyl cellulose. The mortar showed no sag and had good properties throughout.

EXAMPLE VII

The following dry-set mortar mix was made:

| | |
|---|---|
| Portland cement | 393.0 gms |
| sodium carboxymethyl cellulose (D.C. of approx. 0.4) | 2.0 gms |
| polyvinyl alcohol (73% to 77% hydrolyzed) | 5.0 gms |
| sand (−30 mesh) | 600.0 gms |
| Total | 1000.0 gms |

When a portion of the mix was made into a workable mortar by the addition of water, it showed no sag in the standard test, but it had a tendency to be hard to trowel on the wall. It was judged to define generally the upper limit of the amount of sodium carboxymethyl cellulose practical in a dry-set mortar.

EXAMPLE VIII

The following dry-set mortar mix was made:

| | |
|---|---|
| Portland cement | 392.8 gms |
| sodium carboxymethylcellulose (D.S. approx. 0.4) | 1.0 gms |
| polyvinyl alcohol (73% to 77% hydrolyzed) | 4.8 gms |
| hydroxyethylcellulose (30,000 cps) | 1.4 gms |
| sand (−30 mesh) | 600.0 gms |
| Total | 1000.0 gms |

When 69 ml of water was added to a 300 grams portion of the mix, the resulting mortar showed good sag-resistance and had other properties that made it a good dry-set mortar.

EXAMPLE IX

The following dry-set mortar mix was made:

| | |
|---|---|
| Portland cement | 382.5 gms |
| methylcellulose (4000 cps) | 3.5 gms |
| polyvinyl alcohol (73% to 77% hydrolyzed) | 3.0 gms |
| attapulgite clay* | 11.0 gms |
| sand (−30 mesh) | 600.0 gms |
| Total | 1000.0 gms |

*ATTAGEL 150 by Minerals & Chemicals Corp. of America was used.

When 69 ml. of water was mixed with a 300 gm portion of the mortar mix, a sag-resistant mortar with excellent workability resulted.

EXAMPLE X

The following dry-set mortar mix was made:

| | |
|---|---|
| Portland cement | 391.5 gms |
| methylcellulose | 3.0 gms |
| sodium carboxylmethylcellulose (D.S. approx. 0.4) | 0.5 gms |
| attapulgite clay* | 2.0 gms |
| sand (−50 mesh) | 600.0 gms |
| polyvinyl alcohol (73% to 77% hydrolyzed) | 3.0 gms |
| Total | 1000.0 gms |

*"ATTAGEL 40" by Minerals and Chemicals Corporation of America was used.

When water was added to 30 gms of the mix to make a workable dry-set mortar, it showed no sag in the standard test, had an acceptable open time of 45 minutes, and an initial set time of 9½ hours. This example shows that sodium carboxymethylcellulose and attapulgite clay, both in minimal amounts, effect sag-resistance.

EXAMPLE XI

To the following basic dry-set mortar mix the ingredients listed below were added and then water was added to the mix and the resulting mortar was tested for sag-resistance.

| Basic dry-set mortar mix: | Portland cement | 100 gms |
|---|---|---|
| | sand (−30 mesh) | 200 gms |
| | methylcellulose (4000 cps) | 1.8 gms |

| Additive to Basic Mix | Sag-Resistance |
|---|---|
| (a) Attapulgite clay, 3.0 gms | fair |
| (b) Attapulgite clay, 3.0 gms and "RETEN 200", 0.15 gms | good |
| (c) Attapulgite clay, 3.0 gms and "RETEN A-1", 0.15 gms | excellent (no sag) |
| (d) no additive | none |
| (e) Attapulgite clay, 3.0 gms and Alum, 0.3 gm | fair |
| (f) Attapulgite clay, 2.4 gms and "RETEN A-1", 0.15 gms | excellent (no sag) |
| (g) Attapulgite clay, 1.2 gms and "RETEN A-1", 0.15 gms | very good |
| (h) Attapulgite clay, 3.0 gms | |

| Basic dry-set mortar mix: | Portland cement | 100 gms |
|---|---|---|
| | sand (−30 mesh) | 200 gms |
| | methylcellulose (4000 cps) | 1.8 gms |

| Additive to Basic Mix | Sag-Resistance |
|---|---|
| and "RETEN A-1", 0.05 gms | excellent (no sag) |

NOTE:
"RETEN 200" and "RETEN A-1" are trade names of Hercules, Inc. for long-chain acrylamide copolymers, nonionic and anionic, respectively.

The results show that the long-chain acrylamide in very small amounts increases the effectiveness of attapulgite clay for imparting sag-resistance to dry-set mortars. RETEN A-1 gave a Flocculation Index of 0.11 when tested a described in TABLE I at an 0.005 gram level. RETEN 200 gave a Flocculation Index of 0.40 at a 0.030 gram level.

EXAMPLE XII

Using the same basic dry-set mortar mix in EXAMPLE XI, the following additives were tested for their ability to impart sag-resistance to dry-set mortars:

| Additive | | Sag-Resistance |
|---|---|---|
| (a) bentonite clay, | 3.0 gms | very good |
| (b) bentonite clay, | 2.0 gms | fair |
| (c) bentonite clay, | 2.0 gms | |
| and "RETEN A-1", | 0.5 gms | excellent (no sag) |

These results show that the ability of bentonite clay to effect sag-resistance is enhanced by small amounts of the organic flocculating agent "RETEN A-1."

EXAMPLE XIII

Using the same basic dry-set mortar mix of EXAMPLE XI, the following additives were tested for their ability to impart sag-resistance to dry-set mortars:

| Additive | | Sag-Resistance |
|---|---|---|
| (a) slaked lime, | 3.0 gms | none |
| (b) slaked lime, | 3.0 gms | very good |
| and "RETEN A-1", | 0.15 gms | |
| (c) slaked lime, | 2.0 gms | excellent (no sag) |
| and "RETEN A-1", | 0.10 gms | |

These results show that small amounts of long-chain acrylamide copolymer can activate slaked lime to effect sag-resistance in dry-set mortars.

EXAMPLE XIV

Using the basic dry-set mortar mix from EXAMPLE XI, the following additives were added to the dry-mix, and water then added to make a mortar of workable consistency:

| Additive to Basic Mix | Sag-Resistance |
|---|---|
| (a) Talc, 3 gms | none |
| (b) Talc, 3 gms and "RETEN A-1", 0.15 gms | excellent (no sag) |
| (c) Talc, 2 gms and "RETEN A-1", 0.05 gms | excellent (no sag) |
| (d) Wollastonite clay, 3 gms | none |
| (e) Wollastonite clay, 3 gms and "RETEN A-1", 0.15 gms | excellent (no sag) |
| (f) "RETEN A-1", 0.10 gms | good |

EXAMPLE XV

To illustrate the fact that long-chain acrylamide copolymer alone is not as effective as the combination of it with clay, the following were added to the basic dry-set mortar mix and extra water was used to prepare the mortar. Instead of 23 ml. water per hundred grams of mix, 26 ml. water per hundred grams of mix was used. The resulting mortars still workable and usable:

| Additive to Basic Mix | Sag-Resistance |
| --- | --- |
| (a) "RETEN A-1", 0.15 gms | fair |
| (b) Talc clay, 3.0 gms and "RETEN A-1", 0.15 gms | good |

EXAMPLE XVI

Using the basic dry-set mortar mix of EXAMPLE XI, several categories of polymers known to cause flocculation in some systems were checked with wollastonite, talc, and lime, each polymer at the 0.10% level. The mortars were evaluated for whether they showed improved sag-resistance or not.

| Polymer Additive | Wollastonite, 1% | Talc, 0.66% | Attapulgite, 0.5% |
| --- | --- | --- | --- |
| (a) hydroxyalkyl starch (Hercules' CERON 1104-B) | sag resistant | sag resistant | sag resistant |
| (b) polyacrylic acid | no improvement | no improvement | sag resistant |
| (c) polyethylene oxide (Union Carbide Corp.'s POLYOX A 3253) | sag resistant | very little improvement | sag resistant |
| (d) polyacrylamide (Dow Chemical Co.'s SEPARAN NP20) | sag resistant | sag resistant | sag resistant |

(a) and (d) above were effective with wollastonite, talc and attapulgite and gave Flocculation Indices of 0.34 and 0.14, respectively. (b) and (c) were not effective with all of the clay additives and gave Flocculation Indices of 0.80 and 0.85, respectively.

The compositions of the foregoing EXAMPLES were tested in accordance with the procedure for measuring "Sag On Vertical Surfaces" from the American National Standard Specification for Dry-Set Portland Cement Mortar — A1118.1–1967. The results are evaluated and reported as follows:

0 to 1/32 in. = excellent (no sag)
1/32 in. to 1/8 in. = very good
1/8 in. to 1/4 in. = good
1/4 in. to 1 in. = fair
1 in., to complete loss of tile = poor
complete loss of tile = none Tests have shown that the polymers which provide the benefits of the invention must have a Flocculation Index less than about 0.50. The following materials possess a high Flocculation Index and were found not to be effective and do not satisfy the requirements of the invention:

| Additive to Basic Mix | Flocculation Index | Sag-Resistance |
| --- | --- | --- |
| 1. RETEN SPX 5015 - low viscosity grade (10 cps at 1%) otherwise similar to RETEN A-11, 0.10 grams. RETEN SPX 5015 is a low molecular weight polyacrylamide. | 0.60 | none |
| 2. High molecular weight sodium carboxymethyl cellulose, degree of substitution 17 to 1.2, 0.15 grams. | 0.73 | none |
| 3. Polyacrylic acid, molecular wt. 16,000 to 20,000, 0.15 grams. | 0.80 | none |
| 4. RETEN 834.1 (60 cps at 1%), 0.10 grams. RETEN 834.1 is a low molecular weight polyacrylamide. 0.89 | | none |

Though I do not wish to be bound by any particular theory of operation, it appears that the sag-resistance effected by this invention, when used in the preparation of mortar compositions, is the result of controlled flocculation of particles in the mortar. Dry-set mortar without some special additive to effect sag resistance is thixotropic or psuedo plastic in nature and has a very low yield value. Yield value is a rheological property of a slurry that means it will not flow until some level of force is applied. After that level of force is reached, the slurry flows exhibiting viscous properties which are thixotropic in nature. The yield values of the basic dry-set mortar is minimal and not sufficient to effect any sag resistance as defined herein. However, if particles in the mortar can be made to connect loosely in strings or clumps, the yield value of the mortar is increased and sag-resistance is effected.

The applicant has found, as shown in certain of the foregoing EXAMPLES, that certain clays when in a cement slurry environment will connect loosely with themselves and probably with the cement particles also to effect the desired sag resistance, and has found that unusually small amounts of the clays have utility whereas larger amounts have drastic effects on the mortar that render it undesirable or useless for the purpose of setting tile and the like. Particularly, clays of the attapulgite and montmorillonite groups give the desired sag resistance in the cement slurry environment without special help. Other clays, such as kaolin for example, do not effect the desired sag resistance without special help.

Although clays have been added to cement mortars for various reasons for centuries, the amounts have been always much greater and the effects desired have been different. The clays in this invention have been found effective in dry-set mortars at levels between 0.5 and 3.0% by weight of the dry mortar mix. Above the level of about 3.0%, the effect is to stiffen the mix so that it is unworkable or alternatively to require the addition of excess water to thin the mortar which harms its final properties by weakening it and causing undesirable shrinkage.

I have also discovered in accordance with the present invention that certain long-chain organic polymers when added to the mix is very small amounts apparently cause the particles in the mortar to string or clump loosely and thereby effect a higher yield value. Such organic molecules have the ability to flocculate cement particles in the slurry when they are present in certain critical amounts. Very often if an effective organic molecule is present in larger amounts it behaves completely differently and effects no increase in yield value at all, while in some other cases the molecules apparently connect less loosely to the cement particles and at larger amounts in the mix they cause excess stiffening of the mortar much like that caused by excess clays as described above.

While the long-chain organic polymers that effect sag resistance are generally in the category called flocculants or flocculating aids, not all substances called flocculants or flocculating aids are functional in this invention. Some which are effective flocculants in sewerage and water treatment, for instance, are not effective in a cement mortar. It is believed that they sometimes are precipitated in the cement slurry by the polyvalent ions present, such as calcium and aluminum. An example is polyacrylic acid. Other times they may connect to the particles at so many sites along the chain that they effectively wrap around only one or two particles and do not effect a string or clump. At any rate, it has been found that a simple test will evaluate the ability of a molecule to function to effect sag resistance in the cement mortar. The test evaluates the ability for a given amount of additive to flocculate Portland cement, and it is described in detail in TABLE I given hereinbefore.

Now it also has been discovered that when both clay of the attapulgite or montmorillonite groups and a long-chain organic polymer are combined in the same mortar, the ability of the clay to effect sag resistance is increased so that less clay is required and less organic polymer is required than would be equally effective if each were used alone. But more surprising is the discovery that other clays and fine fillers that have negligible effect alone are activated by the presence of the effective long-chain organic polymers described in this invention. When they are present with a small amount of a polymer, sag resistance is achieved which is better than the polymer at that level could achieve by itself.

Consequently, this invention encompasses the use of certain clays in small amounts, certain long-chain organic polymers which give a Flocculation Index below 0.5, determined as described herein, and combinations of the long-chain organic polymers with the certain clays, as well as with other clays and fine fillers, each and all of which are believed to effect sag-resistance in a cement mortar by the same mechanism, namely, by loosely connecting the particles in the mortar into strings or clumps.

The combination of certain clays and long-chain polymer flocculants or coagulants prove to provide especially good sag-resistance properties for conventional Portland cement mortars. Further, clays in addition to attapulgite and bentonite clays can be used when used in combination with certain long-chain organic compounds.

While there have been described herein what are at present considered preferred embodiments of the invention, it will be obvious to those skilled in the art that modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A cementious composition comprising, in the dry mix, 25 to 100% Portland cement, 0 to 75% filler, and 0.001 to 0.25% of the dry mix of a long-chain organic polymer which has a Flocculation Index less than 0.50.

2. A cementious composition in accordance with claim 1, wherein the organic polymer has a Flocculation Index less than 0.30.

3. A dry-set mortar composition comprising, in the dry mix, 25 to 100% Portland cement, 0 to 75% filler and 0.2 to 6.5% of a water-soluble cellulose ether and 0.001 to 0.2% of a long-chain organic polymer having a Flocculation Index of less than 0.50.

4. A cementious composition for use as a tile grout comprising, in the dry mix, 75 to 100% Portland cement, 0 to 25% filler, 0.1 to 0.6% of a water-soluble organic thickener, and 0.001 to 0.2% of a long-chan organic polymer having a Flocculation Index less than 0.50.

5. A cementious composition as in claim 4 wherein the long-chain organic polymer has a Flocculation Index of less than 0.30.

6. A cementious composition as in claim 5 wherein the organic polymer is a long-chain, water-soluble anionic polyacrylamide and comprises 0.01% of the dry mix.

7. A cementious composition as in claim 5 wherein the organic polymer is a long-chain, water soluble polyacrylamide and comprises 0.01% of the dry mix.

8. A cementious composition as in claim 5 wherein the organic polymer is hydroxy alkyl starch with a degree of substitution greater than 0.1 and comprises 0.02% of the dry mix.

9. A cementious composition in accordance with claim 4, wherein the long-chain polymer has a Flocculation Index less than 0.30.

10. A cementious composition suitable for use as a thin-set mortar composition comprising, in the dry mix, 30 to 99.8% Portland cement, up 70% of sand and from about 0.01 to about 0.25% by weight of a long-chain polymeric compound having a Flocculation Index less than 0.50.

11. A composition as in claim 10, wherein the long-chain polymeric compound additive is hydroxyalkyl starch.

12. A composition as in claim 10, wherein the long-chain polymeric compound additive is a polyacrylamide.

13. A composition as in claim 10, wherein the long-chain polymeric compound additive is nonionic long-chain acrylamide copolymer.

14. A composition as in claim 10, wherein the long-chain polymeric compound additive is an anionic long-chain acrylamide copolymer.

15. A composition as in claim 10, wherein the long-chain polymeric compound additive is sodium carboxymethyl cellulose.

16. A method for grouting ceramic tile comprising the steps of:
trowelling in the areas between the ceramic tile a cementious composition comprising, in the dry mix, 75 to 100% Portland cement, 0 to 25% filler, 0.1 to 0.6% of a water-soluble organic thickener, and 0.001 to 0.2% of a long-chain organic polymer having a Flocculation Index less than 0.50 and having added thereto sufficient water to render the composition workable, and washing; and thereafter shaping the joints to final contour with a wet sponge all in one operation, permitting the cementious composition to set thereby retaining the ceramic tile in place.

17. A cementious composition suitable for use as a thin-set mortar composition comprising, in the dry mix, 30 to 99.8% Portland cement, 0.2 to 6.5% of a water-soluble cellulose ether and from about 0.01 to about 0.25% by weight of a long-chain polymeric compound having a Flocculation Index less than 0.50.

18. A cementious composition in accordance with claim 17, wherein the composition contains up to 70% sand.

19. A cementious composition in accordance with claim 18, wherein the water-soluble cellulose ether is present in an amount of about 0.4 to 1.2%.

* * * * *

UNITED STATES PATENT OFFICE
CERTIFICATE OF CORRECTION

PATENT NO. : 4,021,257

DATED : May 3, 1977

INVENTOR(S) : Frank E. Bernett

It is certified that error appears in the above-identified patent and that said Letters Patent are hereby corrected as shown below:

Column 11, line 49, change "A1118.1" to -- A118.1 --;
Column 12, line 16, in the column "Flocculation Index" delete "none" and add -- 0.89 -- and in the column entitled "Sag-Resistance" add -- none -- ;
Column 14, line 16, change "long-chan" to -- long-chain -- .

Signed and Sealed this sixteenth Day of August 1977

[SEAL]

Attest:

RUTH C. MASON
Attesting Officer

C. MARSHALL DANN
Commissioner of Patents and Trademarks